United States Patent
Adkins et al.

(10) Patent No.: US 7,788,490 B2
(45) Date of Patent: Aug. 31, 2010

(54) METHODS FOR AUTHENTICATING AN IDENTITY OF AN ARTICLE IN ELECTRICAL COMMUNICATION WITH A VERIFIER SYSTEM

(75) Inventors: Christopher A. Adkins, Lexington, KY (US); Timothy L. Strunk, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 961 days.

(21) Appl. No.: 11/096,600

(22) Filed: Apr. 1, 2005

(65) Prior Publication Data

US 2006/0224889 A1    Oct. 5, 2006

(51) Int. Cl.
*H04L 9/00* (2006.01)

(52) U.S. Cl. ............................. 713/168; 726/2; 726/21; 347/19

(58) Field of Classification Search ........................ None
See application file for complete search history.

(56) References Cited

U.S. PATENT DOCUMENTS

| | | | | |
|---|---|---|---|---|
| 5,120,939 A * | 6/1992 | Claus et al. | .................. | 235/382 |
| 5,745,576 A * | 4/1998 | Abraham et al. | .............. | 705/73 |
| 6,374,354 B1 | 4/2002 | Walmsley et al. | | |
| 6,406,120 B2 * | 6/2002 | Pauschinger | ................. | 347/19 |
| 6,446,204 B1 * | 9/2002 | Pang et al. | .................. | 713/153 |
| 6,757,832 B1 | 6/2004 | Silverbrook et al. | | |
| 6,816,968 B1 | 11/2004 | Walmsley | | |
| 7,006,627 B2 * | 2/2006 | Hanounik | ..................... | 380/29 |
| 7,286,774 B1 * | 10/2007 | Miller et al. | .................. | 399/12 |
| 2004/0049468 A1 | 3/2004 | Walmsley | | |
| 2004/0099786 A1 | 5/2004 | Su et al. | | |
| 2004/0168071 A1 | 8/2004 | Silverbrook | | |
| 2004/0223609 A1 * | 11/2004 | Wu | ............................. | 380/37 |
| 2005/0010778 A1 | 1/2005 | Walmsley | | |

OTHER PUBLICATIONS

Schneier, Bruce; Applied Cryptography; 1996; John Wiley & Sons, Inc.; Chapter 1; pp. 1-18.*

* cited by examiner

*Primary Examiner*—Jung Kim

(57) ABSTRACT

Methods for authenticating a property of an article in electrical communication with a verifier system including, for example, reading an identification code from the article, generating a challenge phrase from a verifier system, writing a challenge phrase to a first memory location on the article, reading a response phrase from the second memory location on the article, wherein the second memory location is configured to respond with a combinational logic gate output of the second memory location and the first memory location, generating a message authentication code by encrypting the identification code using a predetermined algorithm, generating a comparison code, wherein the comparison code is a combination logic gate output of the message authentication code and the challenge phrase, and determining if the comparison code is equivalent to the response phrase. Articles configured for use with the same.

11 Claims, 2 Drawing Sheets

METHODS FOR AUTHENTICATING AN IDENTITY OF AN ARTICLE IN ELECTRICAL COMMUNICATION WITH A VERIFIER SYSTEM

TECHNICAL FIELD

This invention relates to methods for authenticating a claimant, wherein the authentication is implemented with minimal computational power utilized on the claimant.

BACKGROUND OF THE INVENTION

A field increasing in importance for many industries is the authentication of one component (e.g., the identity of the component) of an electrical system (the claimant) to another component of the system (the verifier). Authentication can be used for a number of different purposes, the specifics of which can be left to individual artisans. In one embodiment, authentication can be used to confirm to the verifier that a particular claimant is what it purports to be or is what the verifier expects it to be. Obviously, in an authentication process such as this, it can be desireable to trust the verifier. One typical means to ensure that the verifier is trusted is for the verifier to be hosted in a physically secure server or computer. The claimant is usually not trusted until authenticated since it is not physically secured and therefore could be copied or altered.

One example of an authentication system is the system utilized in smart cards. The smart card itself is untrusted, thus with each commercial transaction it must be a claimant. The server/computer that it communicates with during the initial transaction is typically in a physically secure location and therefore trusted. Since the server is trusted, it can perform the verifier task for each commercial transaction. The common means typically utilized to implement authentication in such systems is called "challenge-response protocol". The challenge-response protocol has three main steps during the commercial transaction when a claimant needs to be authenticated:

A. The verifier issues a random challenge to the claimant (sends a message with a random number in it to the claimant)

B. The claimant responds back to the verifier with the appropriate answer to the challenge (a unique number that is related to the challenge through cryptography)

C. The verifier confirms the claimant's answer is correct.

If the response is correct, than the claimant is authenticated and the commercial transaction can proceed. Assuming that the cryptographic system has not been compromised, the claimant must be legitimate in order to respond with a correct answer. Two common methods to ensure that only legitimate claimants can respond correctly to a random challenges are symmetrical and asymmetrical cryptography. Both the asymmetrical and symmetrical cryptography methods use algorithms that are published in the public domain, but maintain security through the use of keys that are only known by the systems designers. For example, in the case of symmetrical cryptography, both the verifier and the claimant use the same key. As such, reverse engineering in the claimant will reveal the key used by the verifier to derive the correct answer to the random number challenge. Two symmetric cryptographic algorithms which are widely used are DES and IDEA. DES (Data Encryption Standard) uses a 56 bit key and maps a 64 bit input block of plaintext onto a 64 bit output block of cipher text. IDEA (International Data Encryption Algorithm) uses a 128 bit key to encrypt a 64 bit block of plaintext into a 64 bit block of cipher text.

On the other hand, with asymmetrical cryptography, the claimant uses a different key (public key) to generate the answer than the key (private key) that is used by the verifier to relate the answer to the random challenge. The essential difference from symmetric cryptography is that asymmetric algorithms use two different keys for encryption and corresponding decryption. Each participant owns a unique pair of keys (a secret key and a public key). The secret key and the public key are mathematically dependent from each other, wherein the public key is easy to compute from the secret key, but the secret key is computationally unfeasible from the public key.

One drawback to both of these methods however is that substantial computational power typically must reside in the claimants. While this computational power can be less than required by the verifier, it still requires a significant hurdle for a claimant which may be a simple mobile device. Typical implementations discussed in the prior art have attempted to minimize the required computational power of the claimant. However, microprocessor like (or sequential) computational power is fundamentally required in the claimant for conventional symmetrical and asymmetrical challenge-response protocols, since advanced mathematical functions such as multiplication and modulation must be performed to generate the appropriate response to the challenge. This required computational power is cost prohibitive for many applications. As such, there is a need for a method to authenticate a claimant, wherein the claimant has a much lower threshold of computational power.

SUMMARY OF THE INVENTION

The present invention relates to a method for authenticating a claimant having minimal computational power. Exemplary embodiments of the present invention provide for secure authentication while substantially lowering the computational power of the claimant, therefore allowing for many new applications for authentication (wherein previous authentication processes require substantially greater computational power). In one exemplary embodiment of the present invention, the only computational power required by the claimant is combinational logic. In other words, all that is required is AND, OR and similar logic instead of the multiplication operations typically required by current authentication methods. As such, the claimants might benefit from a much lower cost of electronics.

One aspect of the present invention is a method for sending an authentication response from an article to a verifier system. The method comprises: storing a challenge phrase in a first memory location on the article, wherein the challenge phrase is received from the verifier system; retrieving a message authentication code (MAC) from a second memory location on the article, wherein the MAC is stored in the second memory location at the time of manufacturing of the article; sending a combinational logic gate output of the challenge phrase and the MAC in response to receiving a read request for the second memory location from the verifier system; retrieving a serial number identifier stored on the article, wherein the serial number identifier is stored on the article at the time of manufacturing of the article; and sending the serial number identifier to the verifier system in response to a request for the serial number identifier from the verifier system.

Another aspect of the present invention is a method for authenticating a property of an article in electrical communication with a verifier system. The method comprises: reading an identification code from the article; generating a challenge phrase from the verifier system; writing the challenge phrase to a first memory location on the article; reading a response phrase from a second memory location on the article, wherein the second memory location is configured to respond with a combinational logic gate output of the second memory location and the first memory location; generating a message authentication code (MAC) by encrypting the identification code using a predetermined cryptographic algorithm; generating a comparison code, wherein the comparison code is a combinational logic gate output of the MAC and the challenge phrase; and determining if the comparison code is equivalent to the response phrase.

Exemplary methods of the present invention can be advantageous for providing claimant authentication to a verifier system while minimizing computational power required by the claimant. These and additional advantages will be apparent in view of the detailed description.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

Figure 1A:
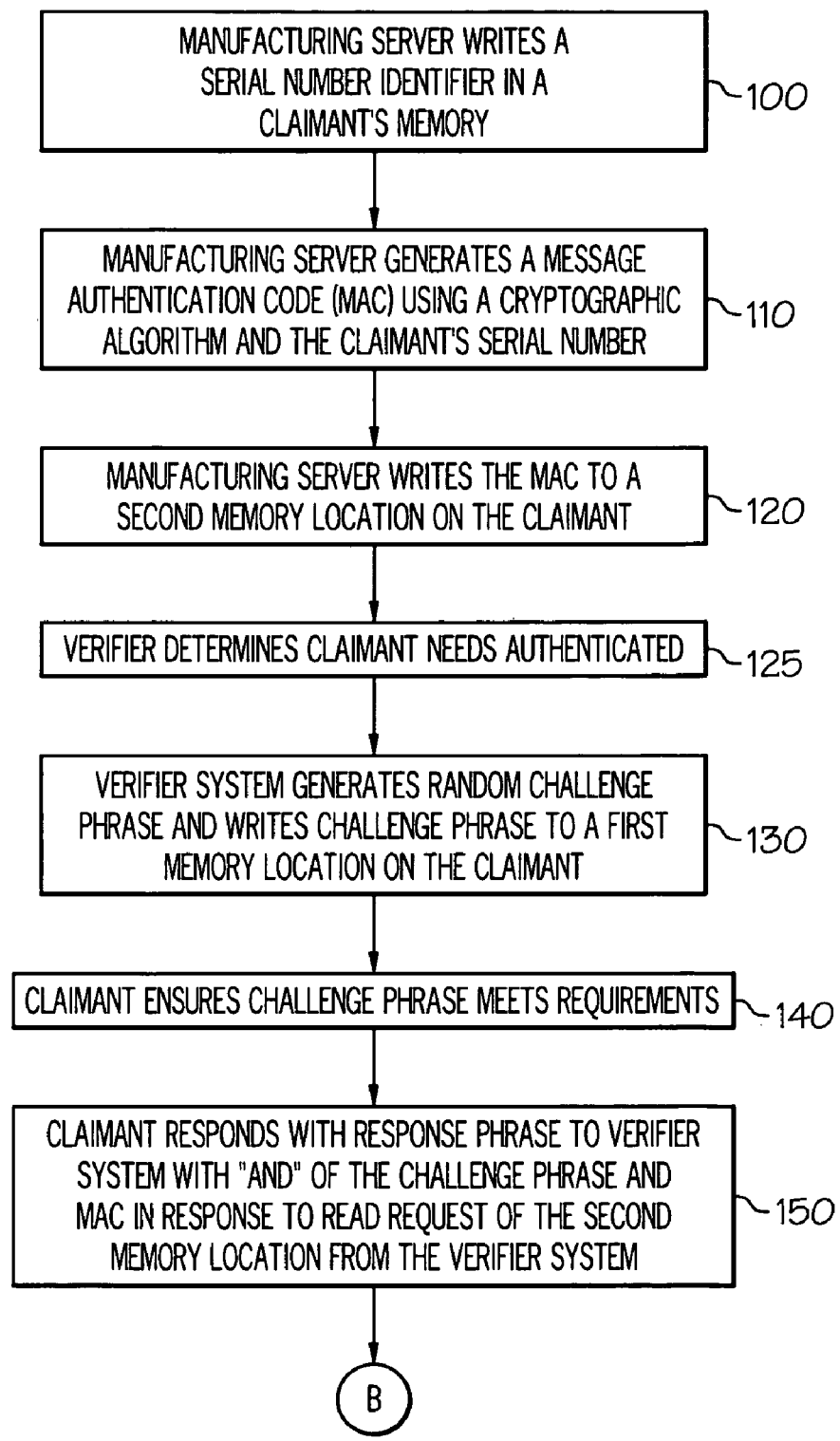
FIGS. 1A and 1B depict a flow chart of an exemplary method for sending an authentication response from an article to a verifier system according to a first embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF EXEMPLARY
EMBODIMENTS OF THE INVENTION

Reference will now be made in detail to various embodiments which are illustrated in the accompanying drawings, wherein like numerals indicate similar elements throughout the views.

One embodiment of the present invention is a method for sending an authentication response from a claimant to a verifier system. The method comprises: storing a challenge phrase in a first memory location on the article, wherein the challenge phrase is received from the verifier system; retrieving a message authentication code (MAC) from a second memory location on the article, wherein the MAC is stored in the second memory location at the time of manufacturing of the article; sending a combinational logic gate output of the challenge phrase and the MAC in response to receiving a read request for the second memory location from the verifier system; retrieving a serial number identifier stored on the article, wherein the serial number identifier is stored on the article at the time of manufacturing of the article; and sending the serial number identifier to the verifier system in response to a request for the serial number identifier from the verifier system.

In another exemplary embodiment, the challenge phrase comprises a randomly generated number. As one skilled in the art will appreciate, the challenge phrase may comprise any number of bits or data. In another exemplary embodiment, the challenge phrase comprises 50 percent 1's and 50 percent 0's.

In yet another exemplary embodiment, if the bit length of the challenge phrase is less than the bit length of the MAC, the challenge phrase will be repeated until the challenge phrase equals the bit length of the MAC. In a similar manner, if the bit length of the challenge phrase is greater than the bit length of the MAC, the MAC could be repeated until the MAC equals the bit length of the challenge phrase. Alternatively, only the lesser bit length could be utilized in the present authentication methods.

As will be appreciated by one skilled in the art, the combinational logic gate may comprise an AND gate or an OR gate. The AND operation is useful when the unprogrammed state of memory is a logical zero. Alternatively, if the unprogrammed state is a logical one, the OR operation may be utilized.

In one exemplary embodiment of the present invention, the method further comprises the claimant verifying the challenge phrase received from the verifier system. As one skilled in the art will appreciate, any verification technique for the challenge phrase known to those skilled in the art may be utilized. Exemplary verification techniques, include but are not limited to checksums and other similar data techniques. One exemplary verification process is to determine if the challenge phrase comprises a predetermined amount of 1's and 0's. For example, in one exemplary embodiment, the challenge phrase is required to have exactly 50 percent 1's and 50 percent 0's to be a valid challenge phrase.

In yet another exemplary embodiment, an article with a property to be authenticated is an ink jet print head. In an alternative exemplary embodiment, such an article might include an ink supply tank or reservoir. Other exemplary articles might include any other component as part of a system in which the authenticity of a property (e.g., identity) of the component is desired. In one exemplary embodiment, the verifier system comprises a printer in electrical communication with the print head or ink supply tank. In other exemplary embodiments, the verifier system may be a computer or a remote server in electrical communication with the claimant. Such communication may comprise a remote computer server connected to the claimant device through the internet or other networks.

For example, the claimant may comprise an ink jet print head or ink supply tank and the verifier system comprise a remote authentication server. To authenticate a property of the ink jet print head or ink supply tank, the printer connects to the remote authentication server. In one embodiment, this connection is through a local computer connected to the printer and the internet. In an alternative embodiment, the printer is directly connected to network, such as the internet, and is in electrical communication with the remote authentication server.

Another exemplary embodiment of the present invention comprises an ink jet print head. The print head comprises ink passage ways connected to an ink discharging outlet provided on a substrate. The print head further comprises first and second memory locations, wherein the first and second memory locations are configured such that they can only be written to one time. The second memory location is further configured such that a combinational logic gate of the first memory location and the second memory location is transmitted in response to a read request of the second memory location.

Another exemplary embodiment of the present invention comprises a method for authenticating a property of an article in electrical communication with a verifier system. The method comprises: reading an identification code from the article; generating a challenge phrase on the verifier system; writing the challenge phrase to a first memory location on the article; reading a response phrase from a second memory location on the article, wherein the second memory location is configured to respond with a combinational logic gate output of the second memory location and the first memory location; generating a message authentication code (MAC) by encrypting the identification code using a predetermined cryptographic algorithm; generating a comparison code, wherein the comparison code is a combinational logic gate output of the MAC and the challenge phrase; and determining if the comparison code is equivalent to the response phrase.

Exemplary cryptographic algorithms include, but are not limited to MD5 (Message Digest Authentication 5), SHA-1 (Secure Hash Algorithm), CMEA, DES, and IDEA. As one skilled in the art will appreciate, any cryptographic algorithm may be utilized to generate the MAC.

In one exemplary embodiment of the present invention, the first memory location, can only be written to one time, utilizing such technology such as EPROM. EPROM (Erasable Programmable Read Only Memory) can be programmed and typically erased to allow re-use. Erasure is typically accomplished using a ultraviolet (UV) light source that shines through a quartz erasing window in the EPROM. In one exemplary embodiment, the EPROM chip is covered with a mask that does not allow UV light to pass through and erase the memory contents. Alternatively, one-time programmable (OTP) EPROM's, sometimes called One Time Programmable Read Only Memory (OTPROMs) can be utilized. OTP EPROM's lack the erasing window, as such this type of memory can only be programmed once. The second memory location is configured as a normal memory location and can be written to the same as normal memory, however, when the second memory location is read the AND of that location with a sister memory location (e.g., first memory location) is returned. The combinational logic is hard coded into the claimant's read addressing scheme.

Figure 1B:
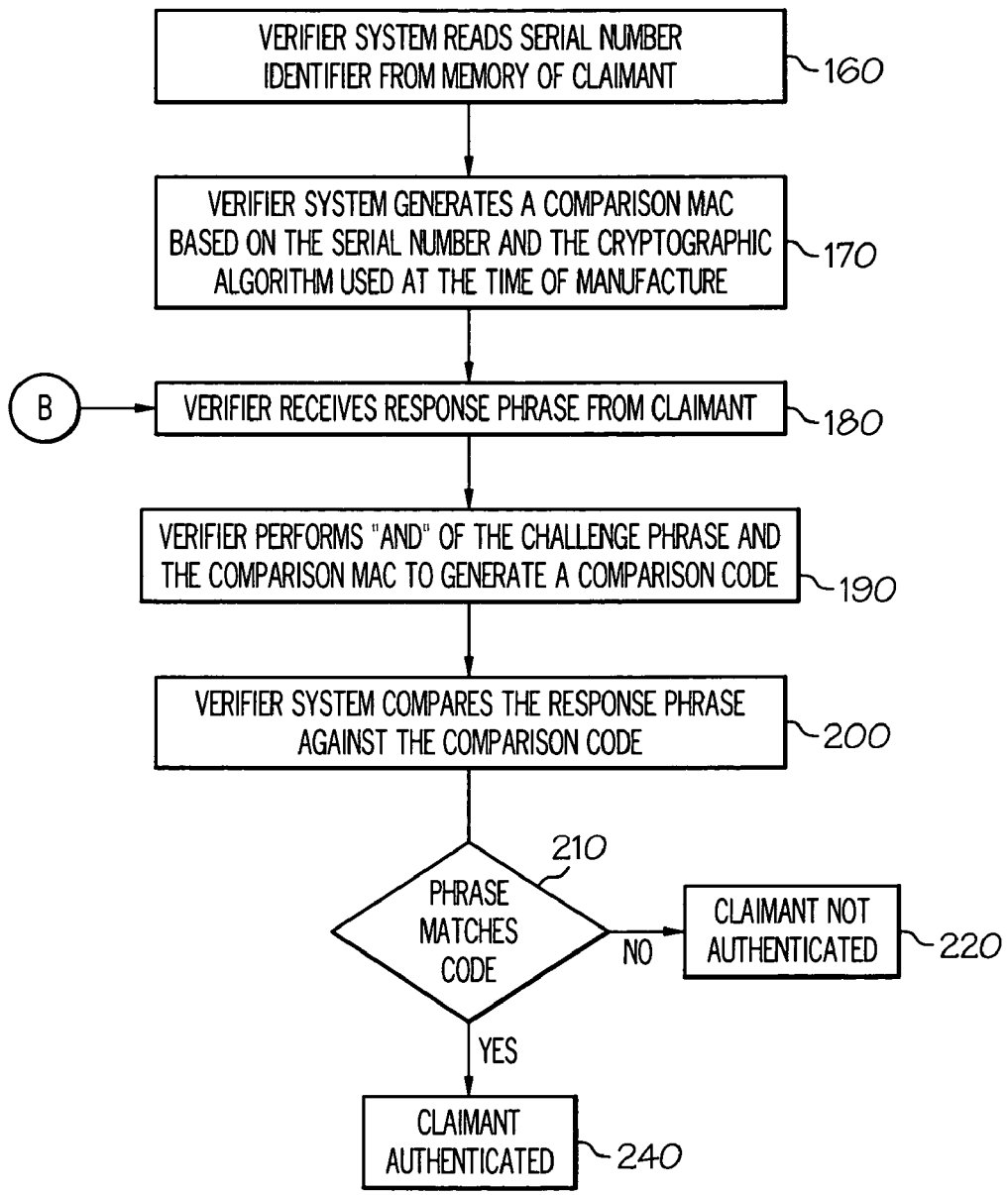

One exemplary embodiment of the present invention is depicted in the flow chart of FIG. 1. FIG. 1 depicts an exemplary method for authenticating a property of a claimant by a verifier system according to one embodiment of the present invention. The method comprises a manufacture server writing a serial number identifier in a claimant's memory at the time of manufacture (100). The manufacturing server generates a message authentication code (MAC) using a cryptographic algorithm and the claimant's serial number (110). The manufacturing server writes the message authentication code to the second memory location on the claimant (120).

At some later point in time, the verifier system determines that a property of the claimant needs to be authenticated (125). For example, in a print head embodiment, a new cartridge may have been installed and the printer/computer requests authentication of the expected identity of the print head. The verifier system generates a random challenge phrase and writes the random challenge phrase to a first memory location on the claimant (130). The verifier system and the claimant are in electrical communication with each other and may be directly connected or connected remotely via a data communication link such as the internet. In one further embodiment, the claimant ensures the challenge phrase meets any pre-determined challenge phrase requirements (140). For example, the claimant may ensure that the challenge phrase is comprised of 50 percent 1's before writing the challenge phrase to the first memory location. In response to a read request of the second memory location on the claimant by the verifier system, the claimant responds with a response phrase which comprises an AND of the challenge phrase stored in the first memory location and the MAC stored in the second memory location (150).

At some point during the authentication process, the verifier system reads the serial number identifier from memory of the claimant (160). The verifier generates a comparison message authentication code based on the serial number identifier using the same cryptographic algorithm used to generate the MAC at the time of manufacture (170).

The verifier system receives the response phrase from the claimant (180). The verifier performs an AND of the challenge phrase and a comparison message authentication code to generate a comparison code (190). The verifier system then compares the response phrase against the comparison code (200). In one exemplary embodiment, this comparison looks at whether the response phrase matches the comparison code (210). If the response phrase does not match the comparison code, the property of the claimant is not authenticated (220). Whereas, if the response phrase does match the comparison code, the property of the claimant is authenticated (240).

In one exemplary embodiment, the verifier system will authenticate a property of the compliant when at least 95 percent of the comparison code matches the response phrase. In some cases, the property of the claimant may only be authenticated one time. In such an exemplary embodiment, the comparison step might further comprise determining if the serial number has been previously authenticated. If the serial number has been previously authenticated, the property of the claimant is not authenticated again.

In yet another exemplary embodiment, the claimant is configured to allow for multiple authentications. In this embodiment, multiple pairs of hidden (i.e., MAC) memory and sister (i.e., challenge phrase) memory locations can be provided. Because the first memory location can only be written to one time, the first memory location will not accept another challenge phrase after having already been written to. Therefore, the verifier system may comprise logic to determine which memory location in the claimant is to be used for the current authentication. For example, the verifier may read the first memory location to see if its contents are empty. If so, the verifier system will write a challenge phrase to the first memory location for that current authentic location. If not, the verifier system will then move to the next pre-determined memory location to see if it is empty and so on. In another exemplary embodiment, the verifier may authenticate each previously used hidden memory location with a sister location containing 50 percent 1's. In yet another exemplary embodiment, a different key or cryptographic algorithm could be used to generate the MAC in each memory location. In this embodiment, the manufacturing and verifier servers would need to be in sync to understand which key is to be used for each memory location.

While particular embodiments of the present invention have been illustrated and described, it would be obvious to those skilled in the art that other various changes and modifications can be made without departing from the spirit and scope of the invention. It is therefore intended to cover in the appended claims all such modifications and changes that are within the scope of the invention.

What we claim:

1. A method for sending an authentication response from an article to a verifier system, comprising:

storing a challenge phrase in a first memory location on the article, wherein the challenge phrase is received from the verifier system;

retrieving a message authentication code from a second memory location on the article, wherein the message authentication code is stored in the second memory location at the time of manufacturing of the article;

generating a combinational logic gate output of the challenge phrase and the message authentication code by using only a single logic gate operation;

sending the generated combinational logic gate output of the challenge phrase and the message authentication code in response to receiving a read request for the second memory location from the verifier system;

retrieving a serial number identifier stored on the article, wherein the serial number identifier is stored on the article at the time of manufacturing of the article;

sending the serial number identifier to the verifier system in response to a request for the serial number identifier from the verifier system;

storing a second challenge phrase in a third memory location on the article, wherein the second challenge phrase is received from the verifier system;

retrieving a second message authentication code from a fourth memory location on the article, wherein the second message authentication code is stored in the fourth memory location at the time of manufacturing of the article; and sending a second combinational logic gate output of the second challenge phrase and the second message authentication code in response to receiving a read request for the fourth memory location from the verifier system.

2. The method of claim 1, further comprising verifying the challenge phrase received from the verifier system.

3. The method of claim 1, wherein the article comprises one of a print head and an ink supply tank.

4. The method of claim 1, wherein the verifier system comprises a printer in electrical communication with the print head.

5. The method of claim 1, wherein the verifier system comprises a remote server in electrical communication with the article.

6. The method of claim 1, wherein the verifier system comprises a computer in electrical communication with the print head.

7. The method of claim 1, wherein the challenge phrase comprises fifty percent 1's and fifty percent 0's.

8. The method of claim 1, wherein the message authentication code comprises an encrypted serial number identifier.

9. The method of claim 1, wherein the combination logic gate comprises an AND gate.

10. The method of claim 1, wherein the combinational logic gate comprises an OR gate.

11. A method for sending an authentication response from an article to a verifier system, comprising:

storing a challenge phrase in a first memory location on the article, wherein the challenge phrase is received from the verifier system;

retrieving a message authentication code from a second memory location on the article, wherein the message authentication code is stored in the second memory location at the time of manufacturing of the article;

sending a combinational logic gate output of the challenge phrase and the message authentication code in response to receiving a read request for the second memory location from the verifier system;

retrieving a serial number identifier stored on the article, wherein the serial number identifier is stored on the article at the time of manufacturing of the article;

sending the serial number identifier to the verifier system in response to a request for the serial number identifier from the verifier system;

storing a second challenge phrase in a third memory location on the article, wherein the second challenge phrase is received from the verifier system;

retrieving a second message authentication code from a fourth memory location on the article, wherein the second message authentication code is stored in the fourth memory location at the time of manufacturing of the article; and sending a second combinational logic gate output of the second challenge phrase and the second message authentication code in response to receiving a read request for the fourth memory location from the verifier system.

* * * * *